United States Patent [19]

Furness

[11] Patent Number: 5,321,353
[45] Date of Patent: Jun. 14, 1994

[54] SYSTEM AND METHOD FOR PRECISELY POSITIONING A ROBOTIC TOOL

[75] Inventor: Duncan Furness, Broomfield, Colo.

[73] Assignee: Storage Technolgy Corporation, Louisville, Colo.

[21] Appl. No.: 882,343

[22] Filed: May 13, 1992

[51] Int. Cl.$^5$ .............................................. B25J 9/00
[52] U.S. Cl. ........................... 318/568.11; 318/568.16; 318/577; 901/47; 395/94
[58] Field of Search ..................... 318/560–646; 395/80–89, 93–96; 901/1, 3, 5, 9, 13, 12, 15–23, 40, 47; 358/88, 101, 107; 364/188, 559; 356/376; 350/130

[56] References Cited

U.S. PATENT DOCUMENTS

| | | | |
|---|---|---|---|
| 4,488,172 | 12/1984 | Hutchin | 358/107 |
| 4,499,492 | 2/1985 | Hutchin | 358/107 |
| 4,573,191 | 2/1986 | Kidode et al. | 350/130 X |
| 4,590,356 | 5/1986 | Poulick et al. | 318/577 X |
| 4,672,564 | 6/1987 | Egli et al. | 364/559 |
| 4,696,574 | 9/1987 | Penney | 901/47 X |
| 4,731,856 | 3/1988 | Lloyd et al. | 358/101 X |
| 4,753,569 | 6/1988 | Pryor | 901/9 X |
| 4,842,411 | 6/1989 | Wood | 356/376 |
| 4,941,106 | 7/1990 | Krieger | 318/568.16 X |
| 4,942,539 | 7/1990 | McGee et al. | 901/47 X |
| 4,956,790 | 9/1990 | Tsuchihashi et al. | 364/188 |
| 5,119,189 | 6/1992 | Iwamoto et al. | 358/88 |
| 5,175,616 | 12/1992 | Milgram et al. | 358/88 |

*Primary Examiner*—Paul Ip
*Attorney, Agent, or Firm*—Sterne, Kessler, Goldstein & Fox

[57] ABSTRACT

A system and method for precisely positioning a robotic tool relative to a worksite, wherein the worksite includes a positioning target located at a fixed position relative thereto is disclosed. A camera coupled to the robotic tool detects the target and generates a position signal representing a current position of the robotic tool relative to the worksite. A system controller receives the position signal and computes a parallax-corrected position based on the distance to the worksite. In addition, the system controller produces a correction signal representing the difference between the parallax-corrected position and the current position. A mechanical arm precisely positions the robotic tool and the worksite relative to each other.

16 Claims, 7 Drawing Sheets

SYSTEM AND METHOD FOR PRECISELY POSITIONING A ROBOTIC TOOL

BACKGROUND OF THE INVENTION

1. Field of the Invention

This invention relates generally to robotic arm positioning using an optical camera, and more specifically to a method of correcting for parallax errors inherent in positioning a robotic arm using a single off-axis optical camera.

2. Related Art

With the advent of robotics technology, automated processing has come into widespread use in numerous facets of today's industry. Robotic systems are employed to perform a myriad of functions from assembly line processes to materials processing to real-time operational processes. These robotic systems are often implemented using a computer-controlled robotic arm.

Applications for robotic arms in assembly line processes include welding, painting, and testing. In the materials processing environment, robotic applications can include, for example, locating materials in a processing environment such as a furnace or a chemical bath, and mixing or processing materials or chemicals. In real-time operational environments, robots are used to perform operational functions such as automated order picking and for computer operations, tape selection and mounting. An example implementation of the tape selection and mounting application is Nearline Automated Cartridge System (ACS), Model 4400, manufactured by Storage Technology Corporation.

To optimize performance of robotic systems in the above-mentioned and other applications, a robotic arm must be positioned quickly and precisely to perform its task. To illustrate this concept, the tape selection and mounting robotic system will be used as an example. In this example, the tape selection robotic system must locate a correct tape to be loaded, and quickly and precisely align its arm to select the proper tape. If the alignment is imprecise, a critical error may result (e.g., the robotic arm could miss the tape entirely or could retrieve the wrong tape). In addition, if the arm is extended when aligned imprecisely, damage to the tape, the robotic arm, or a tape storage bin may result.

Generally, a trade-off exists between the speed and precision with which a robotic arm may be aligned. In conventional systems, attaining a higher degree of alignment precision requires a greater alignment time. In addition if alignment is imprecise, retrieval must be done more slowly to minimize the amount of damage that could be caused by "crashing" the misaligned arm into a bin or a tape cartridge.

Further, a higher degree of precision means that the systems can be designed to tighter specifications. For the tape selection example, this means that bins which house the tape cartridges can be made smaller and positioned more closely to one another. As a result, system size is reduced and tape access time is quicker because the robotic arm has less distance to travel between tapes.

Many conventional systems employ a camera as a means for positioning the robotic arms. In these systems, the camera is mounted to the robotic arm and moves with the robotic arm. The camera, in effect, becomes the 'eyes' of the robotic system. A controller within the robotic system uses the camera to search for a known pattern, called a target. The controller receives electronic signals from the camera indicating the location of the robotic arm with respect to the target. The controller then aligns the robotic arm using that target as a positioning guide.

The camera typically uses a solid-state image sensor array such as a Charge-Coupled Device (CCD) array to sense the target. The sensor array comprises a matrix of discrete photosensing elements. Each sensing element of the solid-state image sensor array is referred to as a picture element, or pixel. Each photosensing element generates a charge packet which is proportional to the intensity of the light focused on the surface of the element. The charge packets from all of the sensors are shifted across the array and read out in the form of electrical information. This electrical information forms an electronic signal which is a representation of the sensed target. From this electronic signal, the location of the target image (or the image of a designated point of the target) on the sensor array can be determined. The image location is indicative of the relative position of the target and the robotic arm.

If the camera is mounted on a common axis with the robotic arm, then precise positioning of the arm can be performed by moving the arm such that the target image impinges on (i.e., is coincident with) the proper pixels of the CCD. However, due to physical constraints, the camera usually cannot be mounted on-axis with the robotic arm. Instead, the camera is mounted off-axis, to one side of the arm. Relocating the camera to this off-axis location results in a phenomenon known as "parallax". "Parallax" is the apparent relocation of an object (e.g., the target) as a result of the relocation of the observer (e.g., the camera).

Parallax can be illustrated by looking at a nearby object with one eye closed and then looking at the same object with the other eye closed. When this is done, the apparent position of the object changes as a result of the different optical path. When the object is closer to the observer, the angle between the two optical paths is greater and hence, the parallax effect is more pronounced.

Figure 1A:
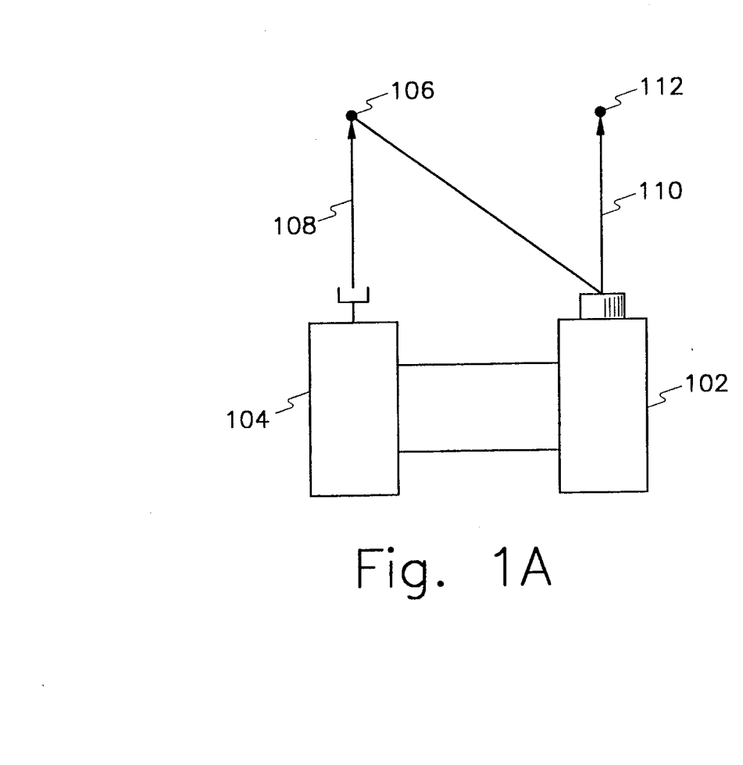
FIG. 1A depicts the problem of parallax in a system using a camera to position a robotic arm.

FIG. 1A illustrates the basic problem of parallax in robotic arm applications. Referring to FIG. 1A, a camera 102 is mounted to a robotic arm 104. Arm 104 is aligned with a worksite 106. Due to parallax, when robot arm 104 is positioned to operate on worksite 106 (i.e. an axis 108 of robot arm 104 is aligned with object 106), worksite 106 appears off-center to camera 102 because it is not on an axis 110 of camera 102. This phenomenon can be illustrated by holding one's finger directly in front of and very close to the left eye, and viewing the finger with the right eye closed. In this situation, the finger is directly centered with the line of vision. However, if the left eye is closed and the right eye opened, the finger appears to the far left of the field of view.

Several techniques have been employed in robotic systems in an attempt to compensate for this problem of parallax. For example, a separate target 112 may be located in a position which is offset to the side of worksite 106. This allows parallax-free positioning provided that the spacing between target 112 and worksite 106 is the same as the spacing between axis 108 and axis 110. However, this required spacing between target 112 and worksite 106 is usually not possible due to size and space limitations in the system. Thus, this technique is normally not practical.

Alternatively, parallax errors may be eliminated by fixing the distance between worksite 106 and target 112 and by fixing the distance between robotic arm 104 and worksite 106. With these distances fixed, the amount of parallax error will be constant and may therefore be corrected. However, if either of the fixed distances varies, then a distance-induced parallax error will occur.

Figure 1B:
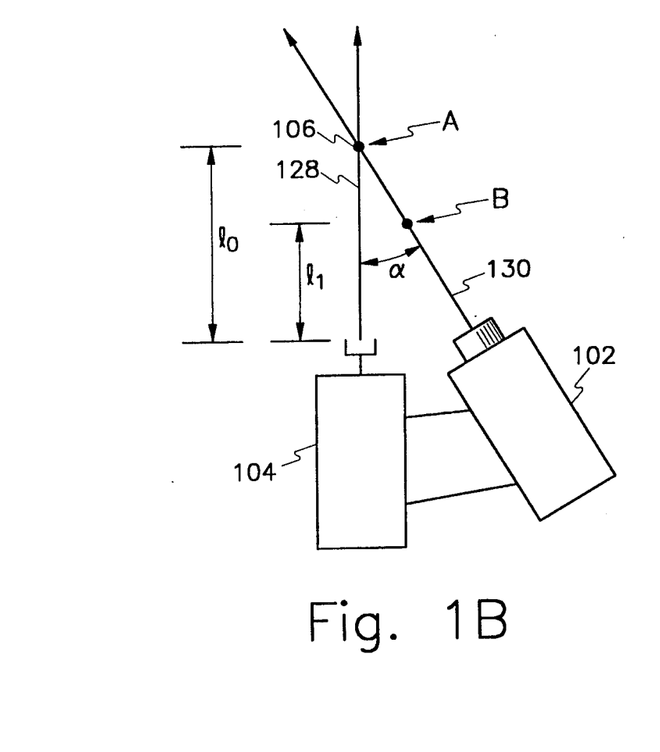
FIG. 1B illustrates the problem of parallax in a system using an off-axis camera mounted at an angle.

FIG. 1B illustrates a second technique which may be used for parallax correction. In this technique, camera 102 is mounted at a fixed angle α with respect to robotic arm 104. When a worksite at a point A is located at the intersection of robotic arm axis 128 and camera axis 130, the system is aligned and free of the effects of parallax. However, as with the first conventional technique, this technique is subject to distance-induced parallax errors. In other words, this technique also requires that certain distances be maintained constant. Worksite 106 must be maintained at a fixed distance from robotic arm 104. If the distance varies, distance-induced parallax errors will occur.

Referring again to FIG. 1B, in this configuration, when the system is positioned such that robot arm 104 is aligned with point A at a distance $l_0$, then camera 102 is also in line with point A. Thus, for a worksite located at a point A which is a fixed distance $l_0$ from robotic arm 104, the system is aligned and free of the adverse effects of parallax.

However, this configuration is free of parallel errors only for targets at a known and fixed distance $l_0$. For example, if the target is at point B which is a distance $l_1$ from arm 104 and camera 102 is aligned with the target, then arm 104 will no longer be aligned with the target. Consequently, robot arm 104 is misaligned due to parallax. The amount of misalignment is a function of the variation in distance.

Note that the system is aligned only when the distance to the target is such that the axis of camera 102 and the axis of robot arm 104 intersect at the target. A similar problem occurs when the target and the worksite to be accessed by the robot are offset.

In many robotic arm applications, target distance cannot be adequately controlled to allow parallex correction in this manner. As a result, distance-induced parallax errors as described above are common. These errors lead to slower positioning, failed positioning, and increased system downtime.

What is needed, then, is a system and method for properly positioning a robotic arm using positioning targets which are located at varying distances from the arm.

SUMMARY OF THE INVENTION

The present invention is a system and method for compensating for parallax errors inherent in positioning systems that use an off-axis camera to aid in positioning a robotic tool. According to the present invention, the system performs a calibration run, wherein the distance to each worksite is measured. These measurements are stored in a measurement table for later recall and use. The robotic tool is then ready for operational use.

During operation, the robotic tool is coarsely positioned to operate on a designated worksite. Precise position is then performed using the off-axis camera and a target which is associated with the worksite. The target is imaged onto the focal plane array of the camera. The location of this target image represents the current, coarse location. The previously stored distance to the robotic worksite is then recalled and used to compute the exact location on the focal plane array that the target image should appear to achieve proper positioning of the robotic arm. This exact location is known as the parallax-corrected position.

A system controller uses the parallax-corrected position to determine the repositioning required to precisely position the robotic tool in relation to the worksite.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

In the drawings, like reference numbers indicate identical or functionally similar elements. Additionally, the left-most digit of a reference number identifies the drawing in which the reference number first appears.

DETAILED DESCRIPTION OF THE INVENTION

1. Example Environment of the Invention

The parallax correction system and method of the present invention were developed for use in an automated information storage system. Specifically, the information storage system for which this invention was developed is the Nearline Model 4400 Automated Cartridge System, ACS, manufactured by Storage Technology Corporation of Louisville, Colo.

In the example environment, information is stored on a plurality of magnetic tapes. Each tape is housed in a cartridge, and the cartridges are stored in tape storage bins. A robotic arm, under control of a processor, selects a tape cartridge from its storage bin and loads the selected tape into a tape drive for access by a processor. The processor then performs a series of read and/or write operations on the tape. Once the tape operations are completed, the robotic arm removes the tape from the tape drive and replaces it in the proper tape storage bin.

Figure 2A:
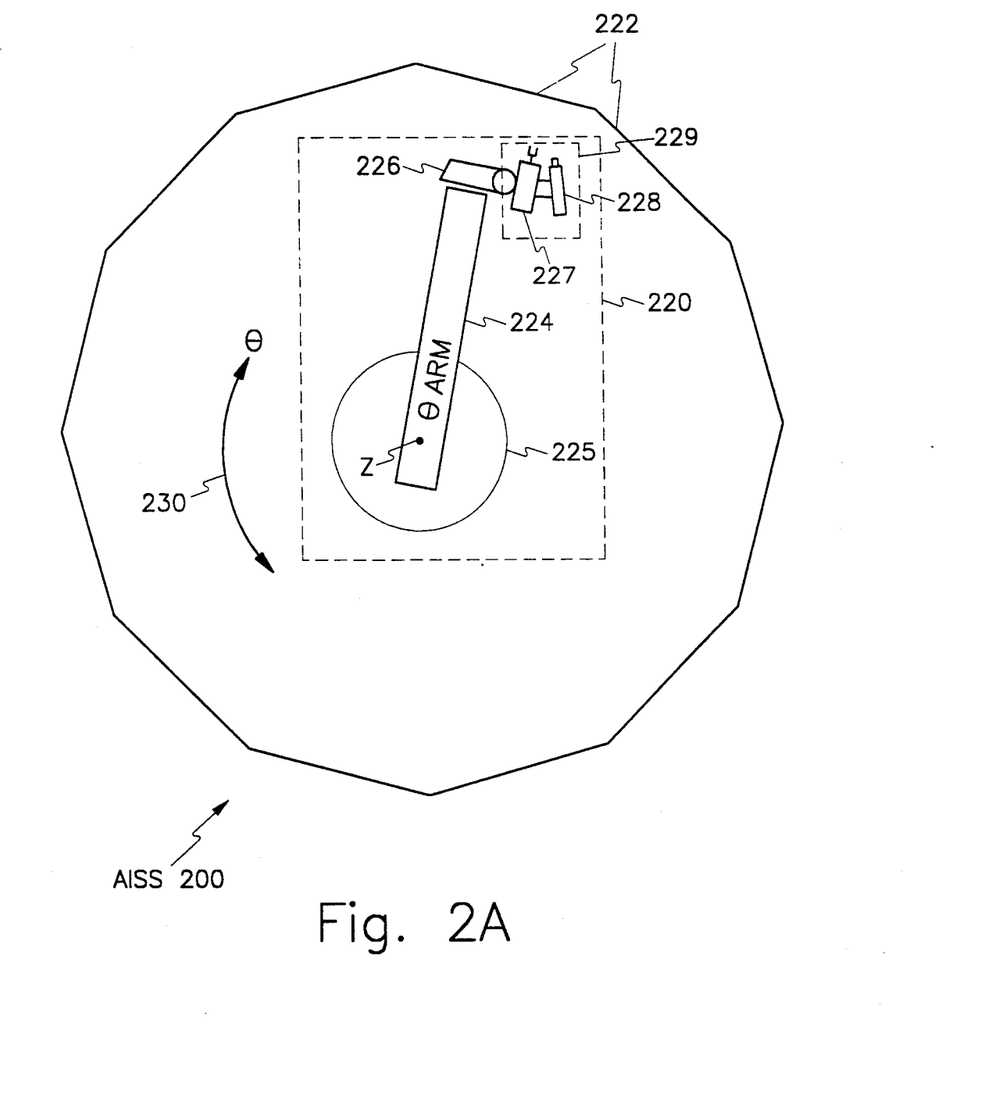
FIG. 2A illustrates a sample environment of the present invention.

FIG. 2A illustrates the automated information storage system 200 (referred to as "AISS 200") that is the example environment of the present invention. In AISS 200, the tape cartridges are mounted on twelve panels 222 surrounding a robotic retrieval system 220. The twelve panels 222 include a plurality of tape storage trays, each tray having up of ten tape storage bins. Each storage bin is adapted to store a tape cartridge. Further, each storage bin is marked by a target to facilitate positioning of robotic retrieval system 220 with respect to the bin.

Figure 2B:
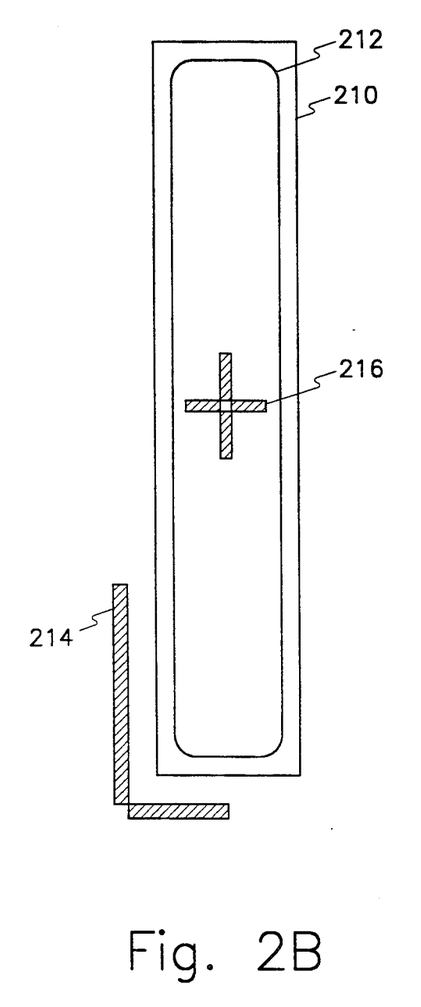
FIG. 2B illustrates a tape cartridge housed in a tape bin and the target associated with the bin.

FIG. 2B illustrates a tape storage bin 210 and its associated target 214. A tape cartridge 212 is located in tape storage bin 210. Target 214 is used as a position indicator. Note that target 214 is offset from bin 210 and tape 212.

Referring again to FIG. 2A, the robotic retrieval system 220 of AISS 200 comprises a Theta arm 224 (referred to as "Θ Arm 224"), a height arm 226, a tape manipulation assembly 229 and a base 225. Assembly 229 comprises a robot tool or tool 227 and a camera 228. Robotic tool 227 is configured to retrieve and replace tape cartridges.

Θ arm 224 is mounted on base 225 and rotates about an axis Z in the Θ direction. The Θ direction is illustrated by arc 230. Tape manipulation assembly 229 is positioned in the Θ direction by Θ arm 224.

Height arm 226 is mounted on the outer end of Θ arm 224. Height arm 226 moves assembly 229 in the Z dimension. The Z dimension is defined by the Z-axis which is orthogonal to the plane of the drawing sheet. Height arm 226 is used to move assembly 229 vertically within AISS 200.

During operation of AISS 200, assembly 229 is positioned such that robotic tool 227 can retrieve or replace a tape cartridge in a tape bin. Positioning is achieved by moving Θ arm 224 and height arm 226 in their respective dimensions. Θ arm 224 rotates about its axis within AISS 200. Height arm 226 moves up or down in the Z dimension. Coarse positioning is achieved using position encoders (not shown), such as tachometers or resolvers.

However, coarse positioning, using these mechanical position determining devices, is not precise enough to facilitate rapid tape retrieval. This imprecision results from mechanical positioning variables such as belt stretch, friction, and tray tolerances. Accordingly, the AISS 200 uses camera 228 to fine tune the positioning of robotic tool 227.

Referring to FIGS. 2A and 2B, to obtain a more precise positioning of assembly 229, and hence robotic tool 227, the system uses camera 228 and target 214. Camera 228 uses a CCD sensor array as its image sensor. Other solid state image sensor arrays may also be used with the present invention. Precise positioning is achieved by positioning assembly 229 such that an image of target 214 is focused onto the proper pixels of the CCD sensor array. As discussed above, an electronic signal from the sensor array indicates the location of the target image on the sensor array, and hence, the relative position of target 214 and assembly 229.

In an ideal AISS 200 where the distance from robotic tool 227 to tape storage bins 210 is constant, the proper pixels are known and do not change from bin to bin. However, due to manufacturing and cost constraints, in an actual AISS 200, the distance from robotic tool 227 to each tape storage bin 210 vary. As a result, the system is susceptible to distance-induced parallax errors. To compensate for such errors, the present invention determines the pixels in camera 228 on which the target image must be focused to achieve precise positioning.

Figure 3:
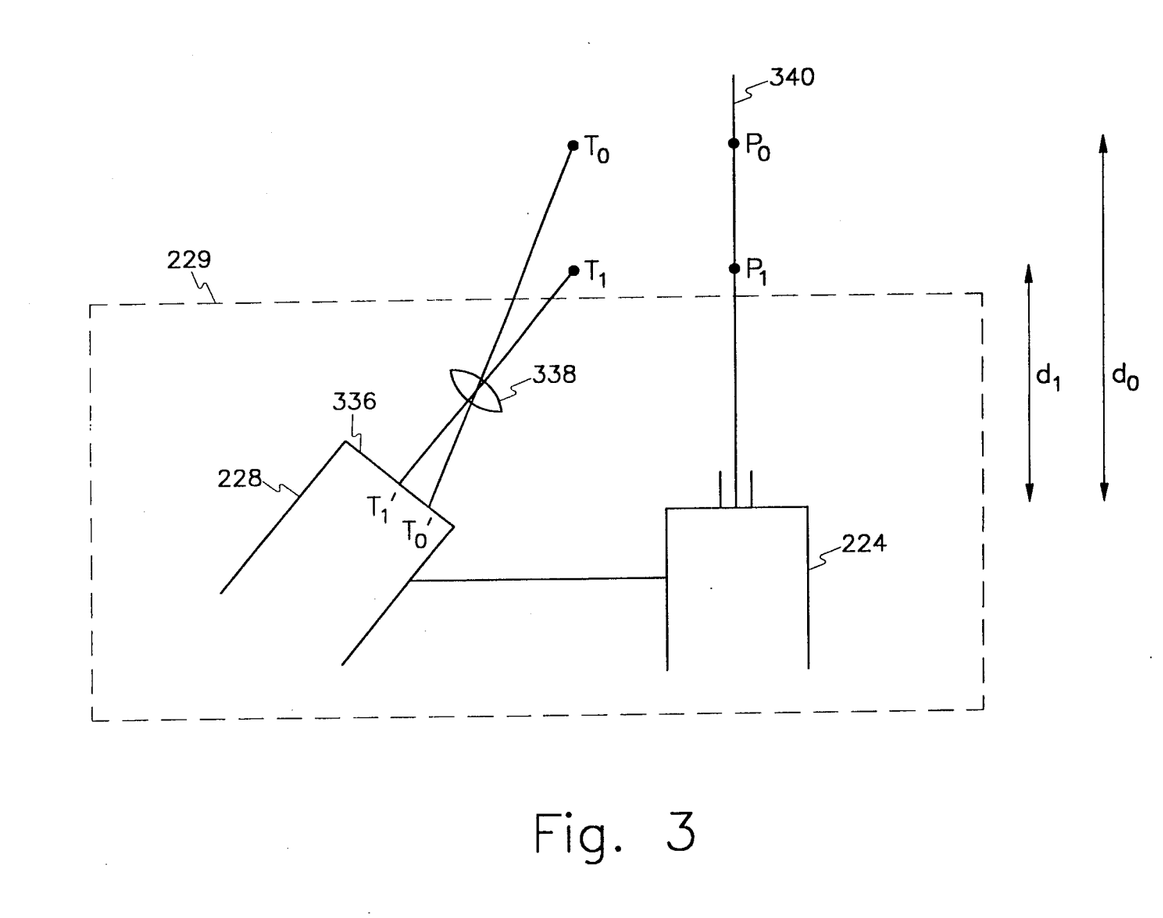
FIG. 3 is a diagram illustrating camera positioning using an off-axis camera.

FIG. 3 illustrates the distance-induced parallax error in this environment. Note that FIG. 3 is not drawn to scale. Specifically, the distance from a target to a tape cartridge location is exaggerated to better illustrate the distance induced-parallax error. Referring to the figure, a camera 228 is mounted at an angle with respect to robotic arm 224. Robotic arm 224 extends along a robotic arm axis 340 to retrieve and replace tape cartridges. A point $P_0$ designates a tape cartridge location at a distance $d_0$ from robotic arm 224. A point $T_0$ designates the location of the target. When robotic arm 224 is properly positioned, its axis 340 is aligned with the tape cartridge location point $P_0$. At this proper position, target point $T_0$ is imaged by a lens 338 onto a focal plane array 336 of camera 228 at a point $T_0'$. Thus, whenever assembly 229 is positioned such that target point $T_0$ falls on pixel location $T_0'$, the system is properly positioned. However, this is true only for tape cartridge locations at a distance $d_0$.

If the distance to a tape cartridge location changes, then alignment of the system so that the target is imaged onto $T_0'$ no longer provides proper positioning. This is illustrated by examining the system when properly positioned to retrieve or replace a tape at a different distance. Specifically, a cartridge location $P_1$ and target $T_1$ are at a distance $d_1$ from robotic arm 224. Distance $d_1$ is smaller than distance $d_0$. Assembly 229 is properly positioned to retrieve or replace a tape cartridge at location $P_1$. Note that when assembly 229 is properly positioned, point $T_1$ is not imaged onto the focal plane array 336 at a point $T_0'$, but is imaged at a new point $T_1'$. Thus, for proper positioning of assembly 229 to retrieve or replace a tape cartridge at a new distance $d_1$, a new point $T_1'$ must be chosen on focal plane array 336. If assembly 229 is positioned such that at $d_1$, $T_1$ is imaged onto $T_0'$, robot axis 340 will not be aligned with the tape cartridge at point $P_1$.

This example can be expanded to a system in which there are N tape cartridge trays, each at a different distance from robotic arm 224. In this expanded system there are N different points on focal plane array 336, each point representing proper positioning for a given tray at a unique distance. The present invention is directed to determining, for each of the tape cartridge trays, a parallax-corrected position on focal plane array 336 such that when a target at a given distance impinges on that parallax-corrected position, the robotic tool 227 is in the correct position to retrieve or replace the corresponding tape cartridge.

2. A Preferred Embodiment of the Present Invention

A preferred embodiment of the present invention will be described in this subsection. As described above, after coarse positioning is achieved, the target associated with the tape cartridge to be retrieved (or replaced) is in the field of view of camera 228. Thereafter, camera 228 is used to aid fine tuning the positioning of robotic Θ arm 224 and height arm 226.

Figure 4:
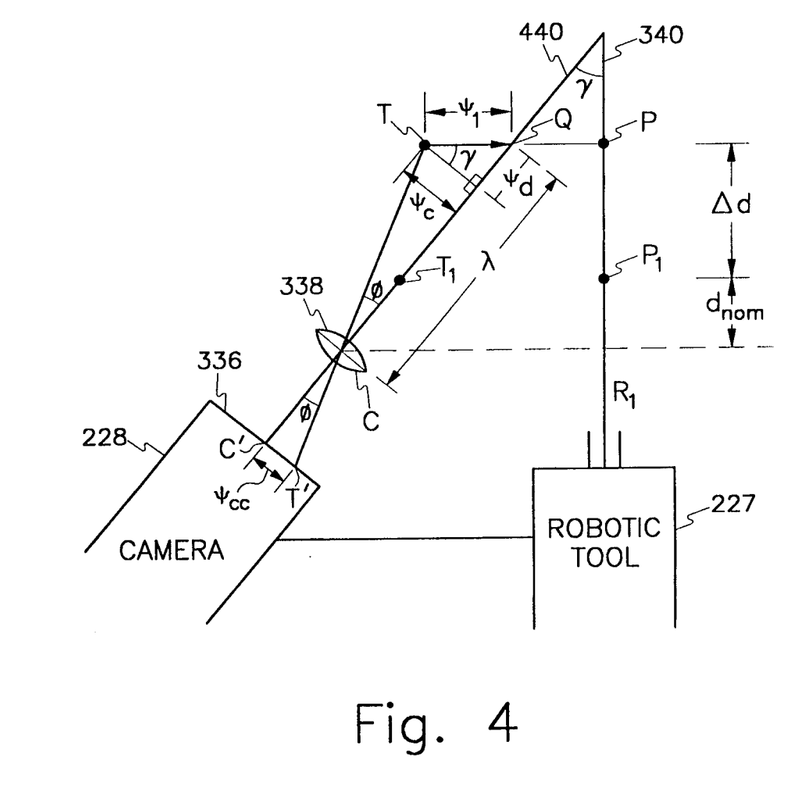
FIG. 4 is a diagram illustrating the geometric relationship between the robotic arm, the camera, a worksite, and a target.

FIG. 4 illustrates the situation where robotic tool 227 is perfectly aligned to retrieve or replace a tape cartridge at a bin denoted by a point P.

For the robotic system, a nominal distance, $d_{nom}$, can be defined. When a tape cartridge (denoted by a point $P_1$) is at distance $d_{nom}$ and robotic tool 227 is precisely aligned with this cartridge at $P_1$, the target associated with that cartridge as denoted by a point $T_1$ will be imaged at a point $C'$ at the center of focal plane array 336 of camera 228.

When robotic tool 227 is aligned with a tape cartridge at a distance other than $d_{nom}$ (designated by $d_{nom}$ plus or minus a distance variation, $\Delta d$), the target associated with this cartridge will no longer appear at the center of focal plane array 336. For example, a target designated by a point T is associated with and offset from tape cartridge P. Tape cartridge location P is located a distance $d_{nom} + \Delta d$ from robotic tool 227.

When robotic tool 227 is perfectly aligned with point P, at this distance, target T is focused onto a focal plane array 336 of a camera 228 at a location T'. As described above in Subsection 1, this location T' is the parallax-corrected position and represents accurate positioning for retrieving or replacing tape cartridges at this distance only. For other values of $\Delta d$, the location of the parallax-corrected position (i.e., the location of the image of target T on focal plane array 336 which will result in precise positioning of robotic tool 227) will vary.

The method of the present invention, then, is to determine a point for each distance ($d_{nom}$ plus or minus $\Delta d$) such that when the location of the image of target T is coincident with that point, robotic tool 227 is perfectly aligned with the tape cartridge to be retrieved. This position can be described in terms of its distance $\psi_{cc}$ from a center point C' on focal plane array 336. Therefore, a method of the present invention is to compute a distance $\psi_{cc}$ from a center point C' on focal plane array 336 for a given tape cartridge at a given distance. It is at distance $\psi_{cc}$ for C' that image T' should appear on focal plane array 336.

The method of a preferred embodiment of the present invention can be summarized as follows. Prior to putting AISS 200 into an operational mode, a calibration run is made wherein the distances from the robotic tool to the tape cartridge trays are measured to obtain $\Delta d$ values for each tray. These $\Delta d$ values are stored in a distance table. The system is now ready for operation.

In an operational mode, the system is requested to retrieve or replace a tape cartridge. The system coarsely positions its robotic arm to the proper bin location. The camera senses the relative position of the target corresponding to the correct tape cartridge bin and sends signals to the system controller indicating this position. The signals indicate the sensor array pixels on which the target is imaged.

A system controller, typically a microprocessor-based controller, accesses the distance table to obtain the $\Delta d$ value for the proper bin location. The system controller uses the distance to compute the proper sensor array location on which the target of the proper bin must be imaged for precise positioning (i.e., the system controller computes the "parallax-corrected position"). The controller compares the measured value (actual location) to the determined value (ideal location) and makes a second determination as to how to position the assembly such that the measured value aligns with the determined value. In other words, the controller determines the change in position required to obtain precise positioning (i.e., the position where the target image is coincident with the correct location on the sensor array). The robotic tool is then moved in the $\Theta$ and/or Z directions to achieve this proper positioning.

Figure 5:
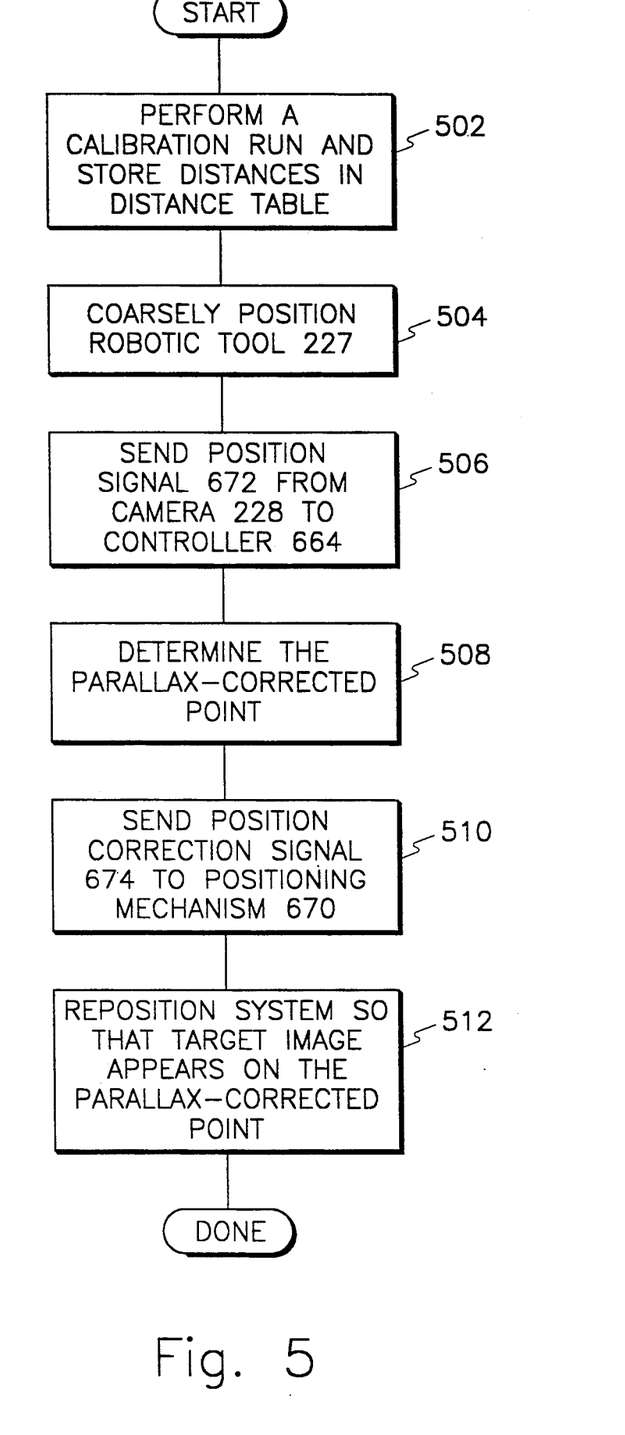
FIG. 5 is a flowchart illustrating the steps of the method of the invention.
Figure 6:
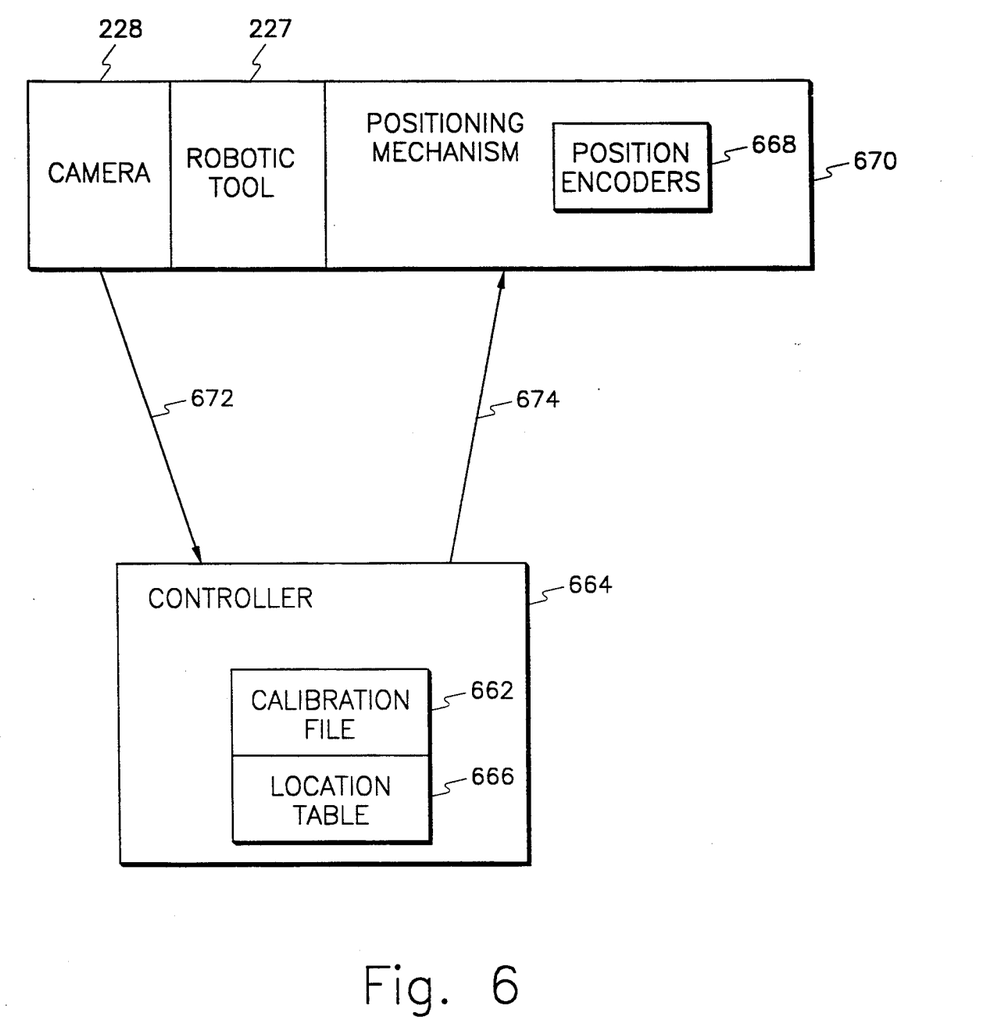
FIG. 6 is a block diagram illustrating the system of the present invention.

The method as summarized above will now be described in detail with reference to FIGS. 4–6. FIGS. 5A and 5B are flow charts illustrating the steps carried out in a preferred embodiment of the method of the invention. FIG. 6 is a block diagram of the system of the invention.

In a step 502, a calibration run is made by the robotic system. In this calibration run, the distance to each of the tape trays is measured using one of a number of conventional techniques. These techniques include a reach-and-touch technique where the robotic tool 227 is extended slowly until it contacts each tray (more specifically, until it contacts a tape cartridge within the tray), thus measuring the distances. In the preferred embodiment, once a distance is measured its $\Delta d$ value (i.e. the difference between $d_{nom}$ and the actual distance) is stored in a calibration table 662 for later access in a step 504. In the example environment, the distance to each tray is actually measured at both ends of the tray. The average of these two distances is then used.

In a step 504, robotic tool 227 is coarsely positioned using a positioning mechanism 670 to retrieve or replace a tape cartridge at location point P. Coarse positioning is achieved using information from encoders 668. When coarse positioning is achieved, the image T' of target T appears within the bounds of focal plane array 336.

In a step 506, a position signal 672 is sent from camera 228 to controller 664. Position signal 672 indicates the pixel locations on which the image T' of target T appears. Controller 664 determines the coarse location of robotic tool 227 relative to the worksite. This determination is based on position signal 672.

In a step 508, the system controller 664 determines the parallax-corrected position that coincides with precise positioning for the proper tape cartridge. The parallax-corrected position is determined using the $\Delta d$ for the proper bin as measured and recorded in step 502 and other known or computed physical parameters. A preferred method for making this determination is discussed in more detail below.

Note, in the preferred embodiment, the parallax corrected point is determined each time a tape cartridge is to be retrieved or replaced. In alternative embodiments, the parallax corrected point for each tray can be determined in advance, and values representing these positions stored in a table. In this alternative embodiment, the stored values are retrieved each time a tape cartridge operation is to be performed. This alternative embodiment has the disadvantage of requiring additional storage space.

In a step 510, system controller 664 compares the parallax-corrected (ideal) position determined in step 508 with the coarse location determined in step 506. The difference between these two locations represents the difference between the actual position and the desired (precise) position of robotic tool 227. Based on this difference, controller 664 generates a position correction signal 674 which is sent to a positioning mechanism 670.

In a step 512, positioning mechanism 670 repositions robotic tool 227 (and attached camera 228) such that image T' of target T appears exactly where it should (on the parallax-corrected position) on focal plane array 336 as determined in step 504. Once repositioned, robotic tool 227 can now rapidly retrieve or replace the desired tape.

The method of the present invention relies on determining the ideal location of the image T' of the target at point T in step 508 (i.e., the parallax-corrected position). This location is determined by computing a distance $\psi_{cc}$ which represents the distance from a center point C' of focal plane array 336 to the proper location of image T'. As described above, this distance will be computed in one or two dimensions depending on whether camera axis 440 is offset from robot arm axis 340 in one or in two dimensions.

The primary task in step 508, therefore, is to determine distance $\psi_{cc}$ in one or both dimensions. Determining this distance in one dimension will be described in the text that follows. The computations for computing this distance in a second dimension are identical.

Referring again to FIG. 4, the distance $\psi_{cc}$ can be written in terms of a simple lens equation:

$$\psi_{cc} = f \tan \phi \quad [1]$$

where f is the focal length of camera 228 and $\phi$ is the angle between camera axis 440 and a line from point T to T'. By simple geometry, the tangent of angle $\phi$ for a right triangle is equal to the length of the side of the triangle opposite to angle $\phi$ divided by the length of the side of the triangle adjacent to angle $\phi$. Therefore, equation [1] can be rewritten as:

$$\psi_{cc} = f \frac{\psi_c}{\lambda - \psi_d} \quad [2]$$

In order to compute $\psi_{cc}$, the system must determine the dimensions $\psi_c$ and $\lambda$. Using simple geometry, $\psi_c$ can be written in terms of the expression:

$$\psi_c = \psi_i \cos \gamma \quad [3]$$

where $\gamma$ is the angle between camera axis 440 and robotic arm axis 340. Since camera 228 is mounted to robotic tool 227 in a fixed and permanent manner, angle $\gamma$ will not change. The term $\psi_i$ in equation [3] is the distance between target point P and a point Q on camera axis 440. Point Q is the point at which camera axis 440 intersects a line TP between target point T and tape location point P.

$\psi_i$ is computed, using simple geometry, as $$\psi_i = \Delta d (\tan \gamma) \quad [4]$$

Therefore, by substituting equation [4] into equation [3], $\psi_c$ can be rewritten in terms of the distance variation to the target:

$$\psi_c = \Delta d (\sin \gamma) \quad [5]$$

Distance $\lambda$, can be computed using simple geometry, the distance $\gamma$ is given by the equation:

$$\lambda = \frac{\Delta d + d_{nom}}{\cos \gamma} \quad [6]$$

Also, by simple geometry $\psi_d$ is found from the expression:

$$\psi_d = \psi_i \sin \gamma \quad [7]$$

Substituting the expression of equation [4] into equation [7] yields the expression:

$$\psi_d = \Delta d \frac{\sin^2 \gamma}{\cos \gamma} \quad [8]$$

Substituting the expressions of equations [5], [6], and [8] into equation [2] yields $$\psi_{cc} = f \frac{\Delta d (\sin \gamma)(\cos \gamma)}{d_{nom} + \Delta d (1 - \sin^2 \gamma)} \quad (9)$$

As previously mentioned, camera 228 may be mounted off-axis with respect to robotic arm 224 in two dimensions. If this is the case, $\psi_{cc}$ must be determined for each dimension. The angle $\gamma$ of camera axis 440 to robotic arm axis 340 may not be the same in one dimension as it is in the other. If this is the case, the proper values for these variables must be used in performing the calculation of step 508.

Other environments using robotic arms, such as assembly lines, may not have targets at distances that can be pre-measured in a calibration run. In these environments, the distance to the target must be measured in real time and immediately used to calculate $\psi_{cc}$. Various methods of real-time distance measurement are available and can be selected on the basis of cost, accuracy, measurement time, and physical constraints. For example, a small laser-ranging device may be implemented to perform a rapid and accurate distance measurement.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for precisely positioning a robotic tool relative to a worksite, wherein the worksite has a target located at a fixed position relative thereto, the apparatus comprising:
    (a) a camera, mounted to the robotic tool at an angle, operable to:
        (1) focus an image of the target onto a focal plane so that when the robotic tool is at a nominal distance from the worksite, said image appears at a specified position on the focal plane, and to
        (2) generate a position signal indicating a current position of the robotic tool relative to the worksite, as indicated by an actual position on said focal plane where said image of the target appears;
    (b) a system controller, in communication with said camera, operable to
        (1) determine a parallax corrected position of said image of the target on said focal plane, wherein said parallax corrected position is separated from said specified position for tool distances other than said nominal distance, said parallax corrected position corresponds to parallax free positioning of the robotic tool relative to the worksite, and said parallax corrected position is based on
            (i) said nominal distance between the robotic tool and the worksite and any variation in distance from said nominal distance,
            (ii) said angle, and
            (iii) a focal length of said camera, and
        (2) generate a position correction signal representing a difference between said current position of the robotic tool relative to the worksite and said desired position of the robotic tool relative to the worksite; and
    (c) a positioning mechanism, in communication with said system controller, to reposition the robotic tool relative to the worksite in response to said position correction signal.

2. The apparatus of claim 1, wherein said positioning mechanism is coupled to the robotic tool and is configured to reposition the robotic tool relative to the worksite by moving the robotic tool.

3. The apparatus of claim 1, wherein said positioning mechanism is coupled to the worksite and is configured to reposition the robotic tool relative to the worksite by moving the worksite.

4. The apparatus of claim 1, wherein said positioning mechanism comprises a plurality of position arms, position encoders and electric motors.

5. The apparatus of claim 1, further comprising means for measuring said distance between the worksite and the robotic tool.

6. The apparatus of claim 1, further comprising memory means for storing said distances measured by said means for measuring.

7. The apparatus of claim 1, wherein said positioning mechanism further comprises means for coarsely positioning the robotic tool and the worksite relative to each other.

8. A method for precisely positioning a robotic tool relative to a worksite, wherein the robotic tool has a camera mounted at an angle thereto, and wherein the worksite has a target located at a fixed position relative thereto, the method comprising the steps of:

(1) focusing an image of the target onto a focal plane of the camera so that when the robotic tool is at a nominal distance from the worksite, said image appears at a specified position on the focal plane;

(2) generating an image position signal representing an actual position on said focal plane where said image of the target appears, said image position signal representing a perceived position of the robotic tool relative to the worksite;

(3) computing a parallax-corrected position of said image of the target on said focal plane, said parallax-corrected position representing the focal plane position on which said image must appear for the tool to be in a precise position relative to the worksite, wherein said parallax-corrected position is determined based on the angle of the camera, a focal length of the camera, said nominal distance between the tool and the worksite, and any variation from said nominal distance;

(4) computing a difference between said actual position of said image and said parallax-corrected position of said image, said difference representing a difference between said perceived position and said actual position of the robotic tool relative to the worksite;

(5) generating a position correction signal based on a difference between said actual position of said image and said parallax-corrected position of said image; and (6) repositioning the robotic tool to said precise position relative to the worksite in response to said position correction signal.

9. The method of claim 8, further comprising a step: measuring the distance from the robotic tool to the worksite.

10. The method of claim 8, wherein said parallax corrected position is stored in a memory for later use.

11. The method of claim 8, wherein said step (3) of determining said parallax corrected position is performed in advance for each worksite and each of said parallax corrected positions determined in said step (3) is stored for later use.

12. The method of claim 8, further comprising the step of measuring an actual distance from said robotic tool to said worksite in advance for each of a plurality of worksites and storing said actual distance, wherein said actual distance includes said nominal distance and said variation therefrom.

13. The method of claim 12, further comprising the step of determining said variation from said nominal distance and storing said variation.

14. The method of claim 8, further comprising the steps of:

measuring an actual distance from said robotic tool to said worksite in advance for each of a plurality of worksites; and determining a difference between said actual distance measured and said nominal distance, and storing said difference as said variation from said nominal distance.

15. The method of claim 8 further comprising a step before step (1) of coarsely positioning said robotic tool relative to the worksite.

16. The method of claim 8, wherein said parallax corrected position is determined as an offset from a center of the focal plane, wherein said offset can be determined in each dimension by the equation:

$$\psi_{cc} = f \frac{\Delta d (\sin\gamma)(\cos\gamma)}{d_{nom} + \Delta d(1 - \sin^2\gamma)}$$

wherein, $\psi_{cc}$ is said offset, f is said focal length, $d_{nom}$ is said nominal distance, $\Delta d$ is said variation from said nominal distance, and $\gamma$ is said angle of said camera to said tool.

* * * * *